US007009763B1

(12) United States Patent
Wolleschensky

(10) Patent No.: US 7,009,763 B1
(45) Date of Patent: Mar. 7, 2006

(54) ARRANGEMENT FOR SEPARATING EXCITATION LIGHT AND EMISSION LIGHT IN A MICROSCOPE

(75) Inventor: Ralf Wolleschensky, Schoeten (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/857,205

(22) PCT Filed: Dec. 22, 1999

(86) PCT No.: PCT/EP99/10262

§ 371 (c)(1),
(2), (4) Date: Jun. 22, 2001

(87) PCT Pub. No.: WO00/37985

PCT Pub. Date: Jun. 29, 2000

(30) Foreign Application Priority Data

Dec. 22, 1998 (DE) ................................ 198 59 314
Aug. 3, 1999 (DE) ................................ 199 36 573

(51) Int. Cl.
G02B 21/06 (2006.01)
(52) U.S. Cl. ...................................... 359/385; 359/368
(58) Field of Classification Search ................ 359/368, 359/369, 370, 371, 385, 386, 387
See application file for complete search history.

(56) References Cited

U.S. PATENT DOCUMENTS

| 4,627,730 A | | 12/1986 | Jungerman et al. ......... 356/489 |
| 4,631,416 A | * | 12/1986 | Trutna, Jr. .................. 250/548 |
| 4,965,441 A | | 10/1990 | Picard .................... 250/201.3 |
| 5,691,839 A | * | 11/1997 | Kobayashi .................. 359/385 |
| 5,751,417 A | | 5/1998 | Uhl ............................ 356/318 |
| 6,222,961 B1 | | 4/2001 | Engelhardt et al. ........... 385/31 |
| 6,510,001 B1 | * | 1/2003 | Engelhardt et al. ......... 359/385 |
| 6,654,165 B1 | * | 11/2003 | Engelhardt et al. ......... 359/385 |

FOREIGN PATENT DOCUMENTS

| DE | 196 33 185 | 10/1997 |
| DE | 196 27 568 | 1/1998 |
| DE | 197 02 753 | 7/1998 |
| EP | 0 148 803 | 7/1985 |
| EP | 0 327 425 | 8/1989 |
| EP | 0 503 236 | 9/1992 |
| EP | 0 562 488 | 9/1993 |
| EP | 0 620 458 | 10/1994 |
| JP | 01 282515 | 11/1989 |
| JP | 04 157413 | 5/1992 |
| JP | 05080366 A * | 4/1993 |
| WO | WO 97 30371 | 8/1997 |
| WO | WO 99 42884 | 8/1999 |

OTHER PUBLICATIONS http://micro.magnet.fsu.edu/primer/java/filters/aotf.*

(Continued)

*Primary Examiner*—Thong Nguyen
*Assistant Examiner*—Arnel C. Lavarias
(74) *Attorney, Agent, or Firm*—Jacobson Holman PLLC

(57) ABSTRACT

Arrangement of a light diffracting element for the separation of excitation light and emission light in a microscope beam path, preferably in a confocal microscope and in particular in a laser scanning microscope, wherein the light diffracting element is traversed both by the excitation light and the emission light and at least one excitation wavelength is influenced by diffraction, whereas other wavelengths emitted by the sample traverse the element in uninfluenced form and consequently are separated spatially from the excitation light.

27 Claims, 4 Drawing Sheets

OTHER PUBLICATIONS

Figure 1:
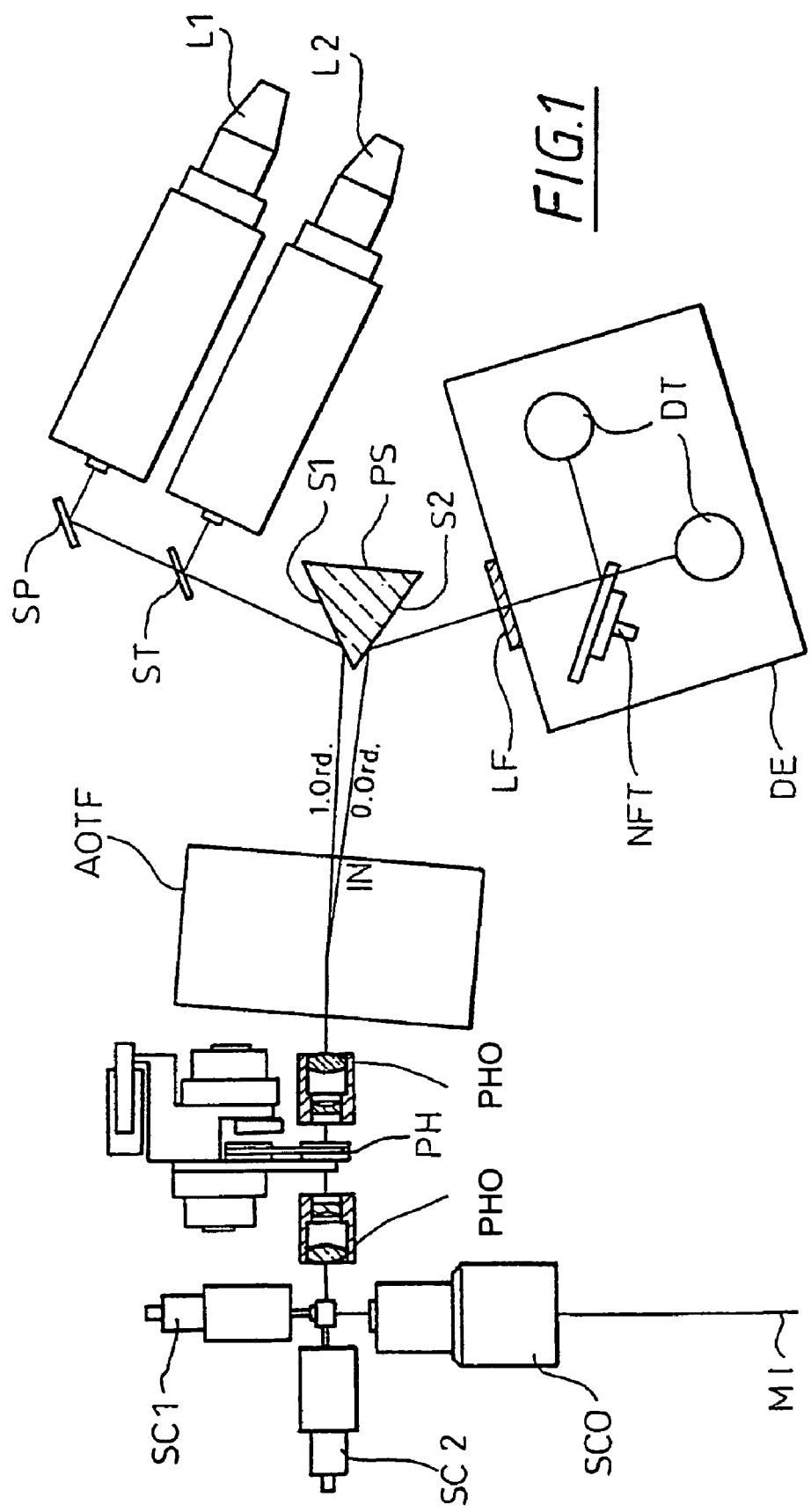

Patent Abstracts of Japan, vol. 016, No. 448 (P-1423), Sep. 17, 1992.

Patent Abstracts of Japan, vol. 014, No. 059 (P-1000), Feb. 2, 1990.

* cited by examiner

ARRANGEMENT FOR SEPARATING EXCITATION LIGHT AND EMISSION LIGHT IN A MICROSCOPE

CROSS-REFERENCE TO RELATED APPLICATIONS

Not applicable.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

REFERENCE TO A "MICROFICHE APPENDIX"

Not applicable.

BACKGROUND OF THE INVENTION (1) Field of the Invention

The present invention is directed to an arrangement for separating excitation light and emission light in a microscope.

(2) Description of related art including information disclosed under 37 CFR 1.97 and 1.98

Not applicable.

BRIEF SUMMARY OF THE INVENTION

Not applicable.

BRIEF DESCRIPTION OF THE SEVERAL VIEWS OF THE DRAWING(S)

FIGS. 1–4 are diagrammatic views of four embodiments of an arrangement for separating excitation light and emission light in a microscope.

DETAILED DESCRIPTION OF THE INVENTION

Figure 2:
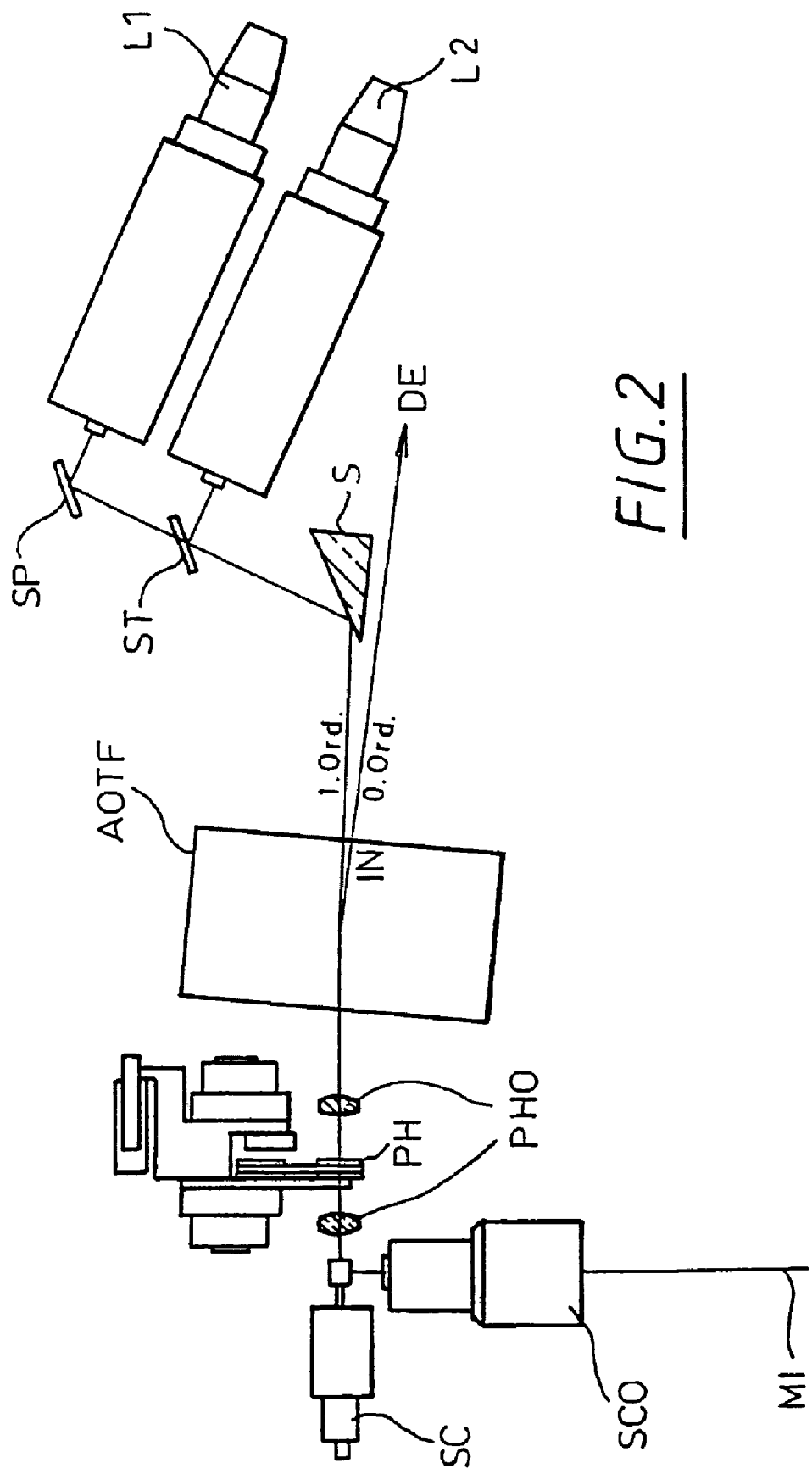
Figure 3:
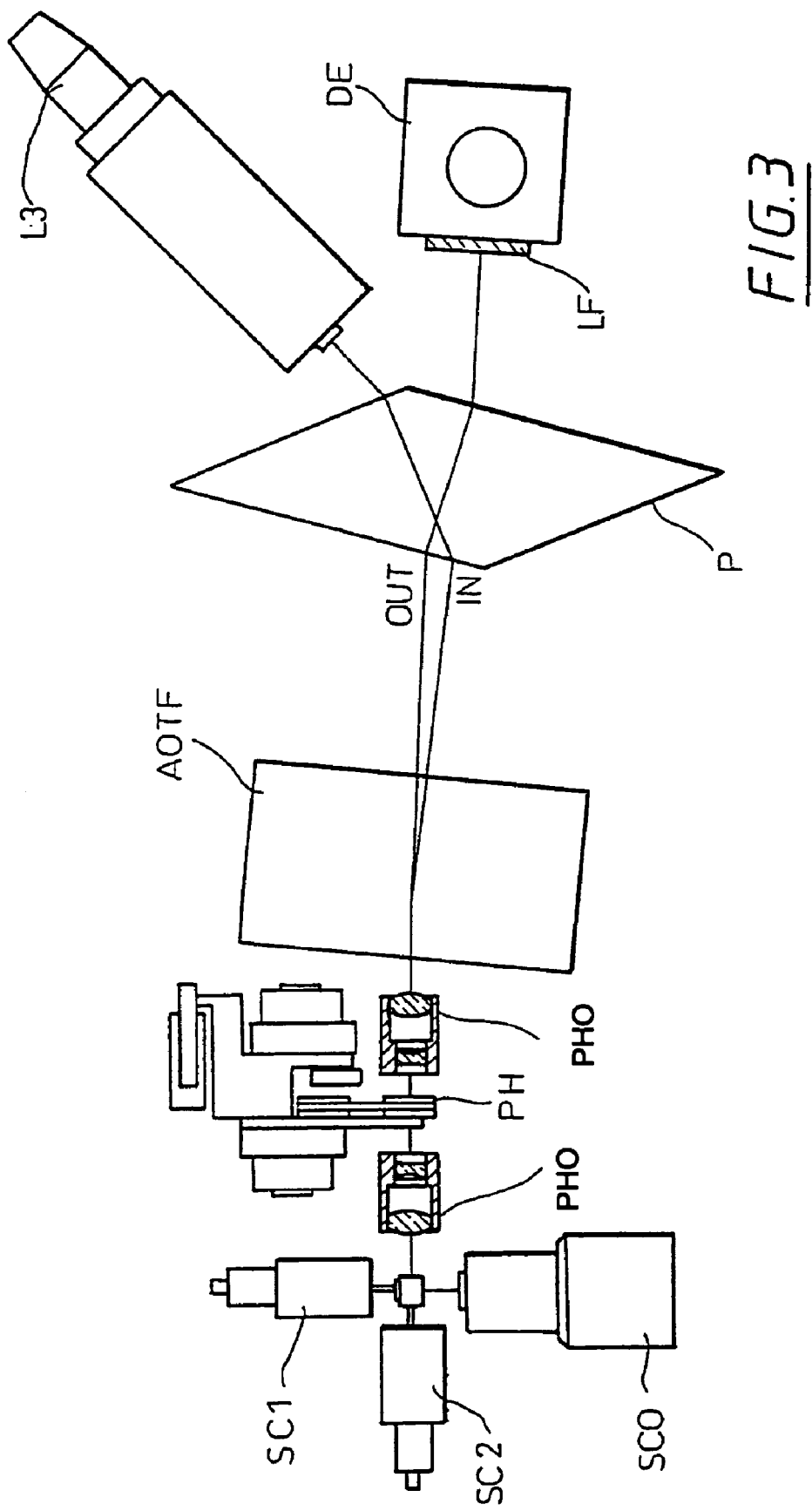

FIGS. 1 to 3 illustrate in exemplified manner arrangements according to the invention.

In FIG. 1 by means of a mirror SP and a beam splitter ST the light (excitation light) of two lasers L1, L2 having different wavelengths is fed into a common beam path, which is reflected on the side S1 of a vapourized prism in the direction of an AOTF (acousto-optical tunable filter). The excitation light is introduced into the AOTF and light diffracted in the first order for the wavelength set by means of the AOTF control frequency is deflected precisely in the direction of a pinhole PH with upstream and downstream pinhole optics PHO for adjusting the beam profile, whereas other possible wavelengths traverse undiffracted in zero order the AOTF and do not reach the pinhole.

In FIG. 1 by means of a mirror SP and a beam splitter ST the light (excitation light) of two lasers L1, L2 having different wavelengths is fed into a common beam path, which is reflected on the side S1 of a vapourized prism in the direction of an AOTF (acousto-optical tunable filter). The excitation light is introduced into the AOTF and light diffracted in the first order for the wavelength set by means of the AOTF control frequency is deflected precisely in the direction of a pinhole PH with upstream and downstream pinhole optics PHO with beam expansion for adjusting the beam profile, whereas other possible wavelengths traverse undiffracted in zero order the AOTF and do not reach the pinhole.

The light emitted by the sample and comprising fractions of the excitation light and wavelength-shifted fluorescence fractions, passes through the light path in the opposite direction up to the AOTF. By first order diffraction the wavelength fractions of the excitation light once again reach the mirror side S1 of prism PS, whereas the fluorescence fractions traverse the AOTF undiffracted in zero order and consequently assume an angle to the reflected excitation light. Between the returning beams of zero and first order is now precisely located the peak between the prism faces S1 and S2, so that the fluorescence light impinges on side S2 and is reflected by the latter in the direction of a detection unit, here in exemplified manner comprising a line filter LF, a colour divider NFT and two detectors for different wavelengths.

As a result of the low AOTF band width of approximately 2 nm for the excitation light it acts as an extreme edge filter with clear advantages compared with dichroic filters with band widths greater than 10 nm.

This is of particular significance, because the spacing between the excitation wavelength and the fluorescence wavelengths can be smaller than 10 nm and as a result of the arrangement according to the invention a wavelength-dependent separation is still possible.

By changing the frequency the AOTF can be switched from the wavelength of laser L1 to the wavelength of laser L2 and once again the excitation light can be separated from the fluorescent light.

In place of the prism with sides S1, S2, it is also possible to use two independent mirrors, which correspond to the sides S1, S2 but which are unconnected. An advantage is that they can also be constructed in rotary manner in order to permit a precise setting to the AOTF or the detection DE.

FIG. 2 shows a similar arrangement with only a single scanner SC. Here in place of the prism is provided a mirror S, which deflects the excitation light in the direction of the AOTF in the same way as in FIG. 1. Here the fluorescent light returning in the zero order through the AOTF passes alongside the mirror S and in this way passes towards a not shown detection.

Fundamentally arrangements are also conceivable in which the AOTF alone can serve as the separation unit for the excitation light and fluorescent light, in that the laser light passes in the first order direction without an upstream element into the AOTF and the detector light leaves the AOTF at an angle to the excitation light and passes directly into a detection unit, which only has effects on the length of the construction, because the angle of e.g. 4° is very small and heterodyning of wavelength fractions should be avoided. In addition, a separating mirror may only be provided for the fluorescent light.

FIG. 3 shows another advantageous construction in the form of an unvapourized prism, which by refraction introduces the light of an excitation laser in the first order into the AOTF and deflects the zero order (fluorescent light) towards the detector DE.

As a result of the angle between the first and zero orders and different wavelengths in advantageous manner a clear separation of the wavelength fractions is possible.

The invention can be used with particular advantage in a laser scanning microscope with an AOTF. Other advantageous uses of another light-diffracting element for beam separation by different diffraction orders are conceivable in a microscope beam path and are advantageously included within the scope of the invention.

Thus it can be used in advantageous manner for regulating the excitation intensity.

Figure 4:
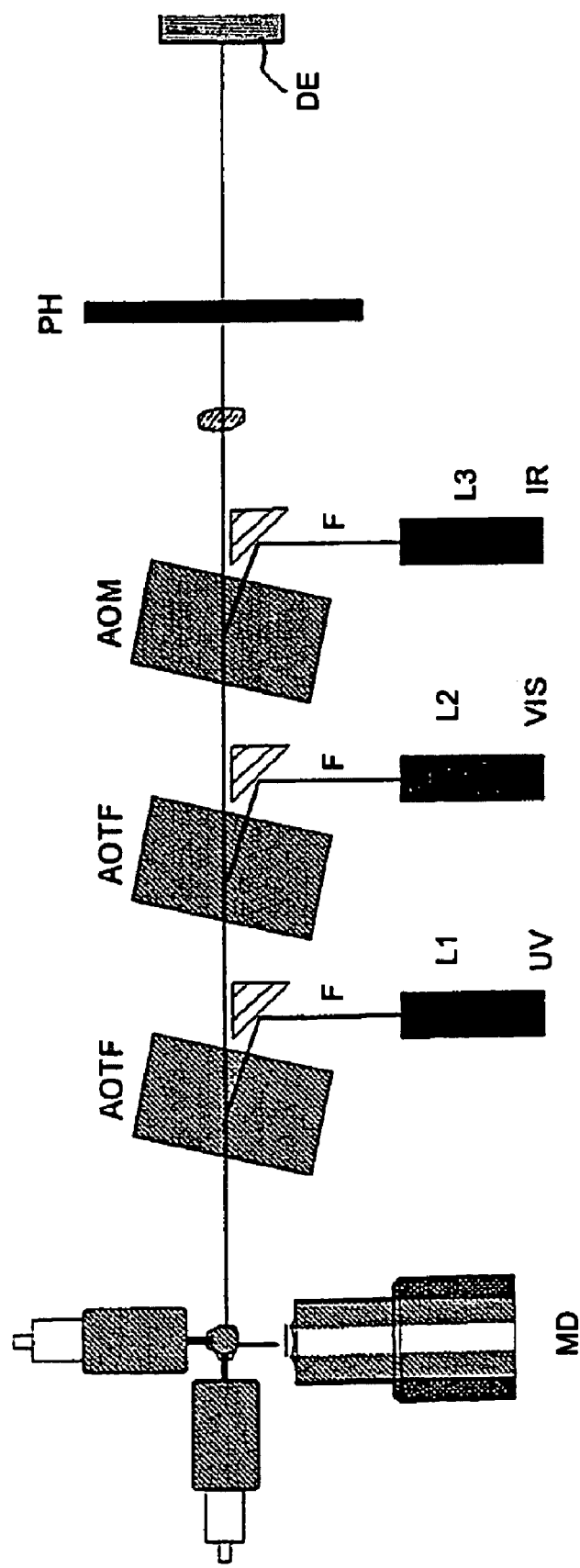

In FIG. 4 several such elements, here AOTF and AOM, are advantageously provided in the laser beam path for feeding in of the laser radiation. Here, the radiation of several excitation laser lines L1–L3 like UV, VIS or IR can be fed in simultaneously or individually into the microscope beam path with an excitation power which can be adjusted independently of each other. The excitation lasers also can be coupled by optic fibers into the scanning module. Viewed in the direction of the microscope optics, the infrared radiation of the infrared-laser (IR) is coupled in first, after which the visible radiation of the visible-laser (VIS) is coupled in and, subsequently, the ultraviolet radiation of the ultraviolet-laser (UV) is coupled into the beam path. Thus, the radiation of the plurality of lasers is successively fed into the microscope beam path in a sequence based on decreasing wavelength when viewed in the direction of the microscope optics.

What is claimed is:

1. A microscope having a microscope beam path and including
    a plurality of light sources which provide excitation light of different wavelengths for irradiating a sample,
    means for imaging the excitation light towards the sample in the microscope beam path, whereby the sample emits excitation and wavelength-shifted emission light,
    a plurality of light diffracting means for feeding the excitation light into the microscope beam path by diffraction of the excitation light, for separating excitation light and wavelength-shifted emission light emitted by the sample in the microscope beam path by diffraction of the excitation light, and for simultaneously or individually feeding in different wavelengths and for independently regulating an excitation intensity of each of the light sources,
    detection means for detecting the wavelength-shifted emission light emitted by the sample following separation of the wavelength-shifted emission light from the excitation light by the diffracting means,
    wherein wavelength-shifted emission light is transmitted undiffracted through the light-diffracting means and the light diffracting means is so positioned with respect to the beam path and the detection means that only undiffracted light is detected by the detection means,
    wherein the light diffracting means are arranged on a common optical axis, and
    wherein the excitation light of each of the light sources is coupled into the microscope beam path by means of a separate on of the plurality of light diffracting means.

2. The microscope of claim 1, wherein the light emitted by the sample comprises fractions of the excitation light and of wavelength-shifted fluorescence fractions.

3. The microscope of claim 1, wherein the light diffracting means influences at least one excitation wavelength by diffraction, whereas other wavelengths emitted by the sample pass in uninfluenced form through the element and are thereby spatially separated from the excitation light.

4. The microscope of claim 1, wherein the microscope is a laser scanning microscope.

5. The microscope of claim 4, further including means for switching the light diffracting means by way of a frequency change from a first wavelength of a first laser to a second wavelength of a second laser.

6. The microscope of claim 1, further including at least one optical means for influencing the light direction provided in at least one of the excitation beam path upstream of the light diffracting means and the detection beam path downstream of the light diffracting means in order to improve light fraction separation.

7. The microscope of claim 6, wherein the optical means comprises a light refracting element.

8. The microscope of claim 1, wherein the light diffracting means comprise firstly an AOTF and then an AOM in the direction of detection.

9. The microscope of claim 1, wherein the light diffracting means is chosen from the group consisting of an AOTF and an AOM.

10. The microscope of claim 1, wherein the microscope is a confocal microscope.

11. A fluorescence microscope, comprising:
    radiation means for emitting excitation light for irradiating a sample, whereby the sample emits excitation and wavelength-shifted fluorescence light, the radiation means comprising a plurality of light sources which provide excitation light of different wavelengths,
    detection means for detecting wavelength-shifted fluorescence light emitted by the sample,
    microscope optics means for directing excitation light from the radiation means towards the sample and for directing the excitation and the wavelength-shifted fluorescence light emitted by the sample back in the direction of the radiation means and the detection means,
    a plurality of acousto-optical means which are arranged on a common optical axis for individually feeding the excitation light from the light sources into the microscope optics means by diffraction of the excitation light, for independently regulating an excitation intensity of each of the light sources,
    and for separating excitation light and wavelength-shifted fluorescence light emitted by the sample by diffraction of the excitation light, the acousto-optical means being so positioned between the radiation means and the microscope optics means that only diffracted excitation light is introduced into the microscope optics means, wherein:
    in the direction of the microscope optics means as the acousto-optical means are firstly provided an AOM and then an AOTF,
    excitation light emitted by the sample is deflected by diffraction in the direction of the radiation means by the acousto-optical means, and
    wavelength-shifted fluorescence light emitted by the sample is transmitted undiffracted through the acousto-optical means and is thereby spatially separated from excitation light emitted by the sample,
    the detection means is so positioned with respect to the acousto-optical means that wavelength-shifted fluorescence light transmitted undiffracted through the acousto-optical means is detected by the detection means, and
    the acousto-optical means is so positioned with respect to the microscope optics means and the detection means that only undiffracted light is detected by the detection means, and further comprising:

filter means for selectively detecting wavelength-shifted fluorescence light in the detection means positioned between the acousto-optical means and the detection means.

12. The fluorescence microscope of claim 11, further comprising at least one optical means for influencing the light direction provided in at least one of an excitation beam path upstream of the acousto-optical means and a detection beam path downstream of the acousto-optical means to bring about improved separation of the light fractions.

13. The fluorescence microscope of claim 12, wherein the optical means comprises a reflection element, selected from the group consisting of a mirror, a bimirror and a vapourized prism.

14. The fluorescence microscope of claim 13, wherein the optical means further comprises a light refracting element which is located in at least one of an excitation beam path upstream of the acousto-optical means and a detection beam path downstream of the acousto-optical means.

15. The fluorescence microscope of claim 14, wherein the light refracting element comprises an unvapourized prism.

16. The fluorescence microscope of claim 12, wherein the optical means comprises a light refracting element which is located in at least one of an excitation beam path upstream of the acousto-optical means and a detection beam path downstream of the acousto-optical means.

17. The fluorescence microscope of claim 16, wherein the light refracting element comprises an unvapourized prism.

18. The fluorescence microscope of claim 11, wherein the fluorescence microscope is a confocal fluorescence laser microscope.

19. The fluorescence microscope of claim 11, wherein the light sources are lasers.

20. The fluorescence microscope of claim 19, wherein the radiation of the plurality of lasers in the direction of the microscope optics means is successively fed into the microscope beam path in a sequence based on decreasing wavelength.

21. The fluorescence microscope of claim 11, wherein at least one optical fibre is provided for feeding in excitation light.

22. The fluorescence microscope of claim 11, wherein the excitation light is introduced into the microscope optics means by diffraction at the acousto-optical means in the first diffraction order.

23. The fluorescence microscope of claim 11, further comprising an excitation and detection pinhole located upstream of the microscope optics means.

24. The fluorescence microscope of claim 11, wherein the acousto-optical means are chosen from the group consisting of an AOTF and an AOM.

25. A device for feeding light into a microscope beam path and for detecting emission light emitted by a sample, comprising:
   a plurality of light sources which emit excitation light of different wavelengths, which excitation light is irradiated through the microscope beam path onto a sample, whereby the sample emits excitation and wavelength-shifted emission light which is directed back along the microscope beam path,
   detection means for detecting the wavelength-shifted emission light emitted by the sample, and
   a plurality of light diffracting means located on a common optical axis for individually feeding the excitation light of the plurality of light sources into the common optical axis by diffraction of the excitation light, for independently regulating an excitation intensity of each of the light sources, and for separating excitation light and wavelength-shifted emission light emitted by the sample by diffracting the excitation light and transmitting undiffracted the wavelength-shifted emission light, and wherein:
   at least one of the light diffracting means is associated with each light source and the different wavelengths by diffraction in the light diffracting means are simultaneously or individually fed into the common optical axis and are combined in the common optical axis,
   the detection means is so positioned with respect to the light diffracting means that only light transmitted undiffracted through the light diffracting elements is detected by the detection means, wherein the light diffracting means are chosen from the group consisting of an AOTF and an AOM, and wherein, in the direction of the microscope optics beam path, firstly an AOM and then at least one AOTF are arranged.

26. The device of claim 25, wherein the microscope is a confocal fluorescence laser microscope.

27. The device of claim 25, wherein the plurality of light diffracting means comprise acousto-optical elements.

* * * * *